March 20, 1956 — J. N. ANDERSEN — 2,739,041
SILICON TETRACHLORIDE MANUFACTURE
Filed July 3, 1953
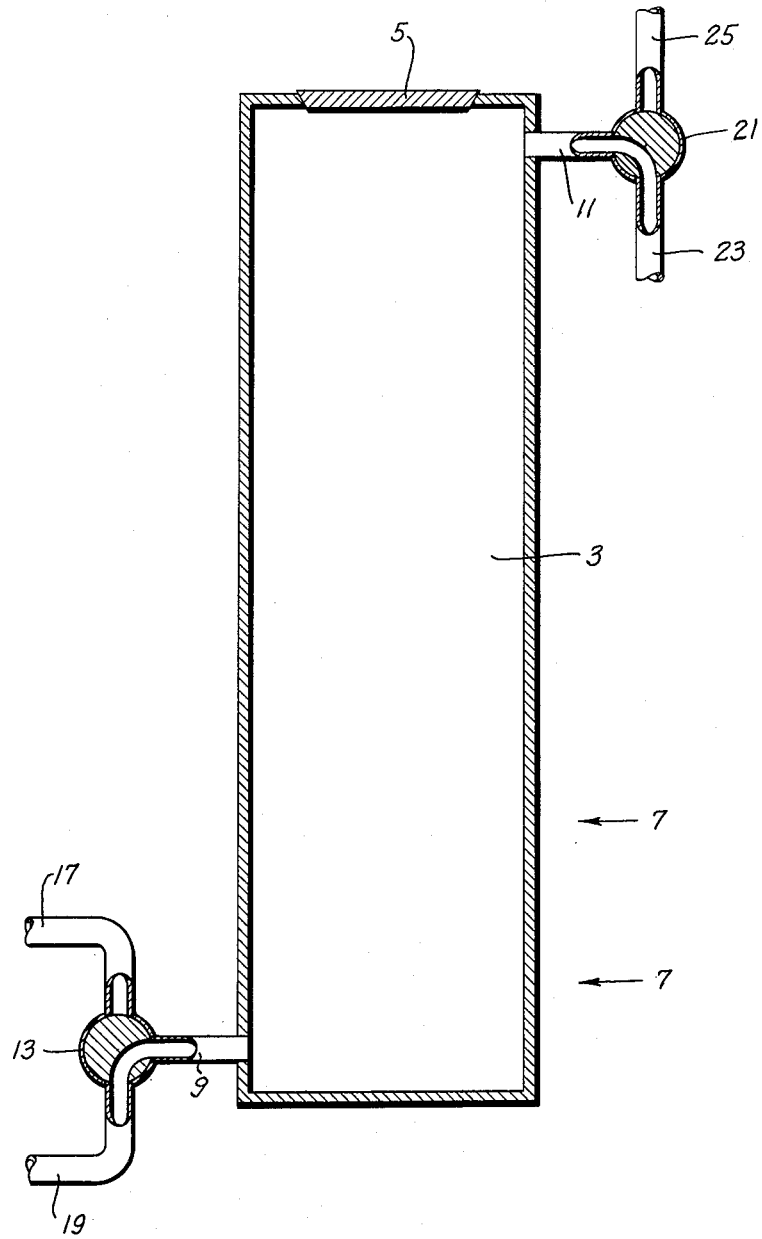
INVENTOR.
John N. Andersen
BY ECKHOFF & SLICK, Attys.
A member of the firm.

United States Patent Office 2,739,041
Patented Mar. 20, 1956

2,739,041
SILICON TETRACHLORIDE MANUFACTURE

John N. Andersen, Grand Island, N. Y., assignor to Stauffer Chemical Company, a corporation of California Application July 3, 1953, Serial No. 365,806

2 Claims. (Cl. 23—205)

This invention relates to a method of manufacturing silicon tetrachloride, and, more specifically, relates to a method for removal of carbon ash from a reactor in which silicon tetrachloride is manufactured.

In the manufacture of silicon tetrachloride, granules of silicon carbide are placed in a reactor, the reactor is heated to a red heat, and chlorine gas is passed through the reactor. The reaction proceeds as follows:

$$SiC + 2Cl_2 \rightarrow SiCl_4 + C$$

The silicon tetrachloride is produced in vapor phase and is then passed to a condenser where it is condensed. The carbon which is formed in the reaction is largely deposited throughout the bed of hot silicon carbide.

In the past, the only way known to remove the carbon was to periodically shut down the furnace and physically remove the carbon by scraping. Since such reactors are ordinarily very large, it requires a considerable period of time to cool the reactor off sufficiently that men can work near it, and also requires a considerable period of time to again heat the reactor to optimum reaction temperature. Further, some of the unreacted silicon carbide is always lost when the carbon is removed. In addition, ash removal by scraping results in a considerable liberation of fumes and promotes channeling, resulting in poor chlorine efficiency. For these reasons, the operation has been unduly expensive.

It is therefore the object of the present invention to provide a method for the manufacture of silicon tetrachloride wherein the carbon is removed rapidly from the reactor without the necessity of cooling off the reactor.

Another object of this invention is to provide a method of making silicon tetrachloride in which the reactor is cleaned out periodically without the necessity of physical contact with the reactor.

In general, the objects of the present invention are accomplished by periodically blowing air through the reactor. The air which is blown through the reactor has a two-fold function. In the first place, it oxidizes a portion of the carbon so that the carbon is removed from the reactor as carbon monoxide and/or dioxide. In the second place, a considerable portion of the carbon within the reactor is in a very fine form and is entrained by the air and physically carried from the reactor by the air blast as elementary carbon. Contrary to what one would normally expect, it has been found that there is no observable reaction between the hot silicon carbide and air, so that substantially none of the silicon carbide is lost through oxidation. Although air is completely satisfactory for use in carrying out the cleaning operation, other oxygen-containing gases, including pure oxygen, can be used.

In the drawing forming a part of this application, there is shown in diagrammatic fashion a reactor which is used for the production of silicon tetrachloride. The equipment consists of a shaft type furnace 3, having a charging opening 5 at the top. The furnace is equipped with a source of heat 7, so that it can be brought readily to operating temperature. At the bottom of the furnace, a line 9 is provided for the introduction of gas to the furnace. At the top of the furnace a line 11 is provided for the removal of gas. The line 9 has a two-way valve 13 so that the line 9 may be connected to a source of air 17 or a source of chlorine 19, at will. The line 11 is also equipped with a two-way valve 21, so that the line 11 may be connected to a condenser 23, or to a line 25, which leads to a stack or to an entrainment separator.

The following operating example illustrates a method of carrying out the cleaning operation wherein the cycle is eighteen hours on chlorine, and four hours on air. This cycle has been found to be effective, although either shorter or longer times may be used.

Example 1.—A shaft type furnace such as that shown in the drawing is charged with 5,000 pounds of silicon carbide and the furnace is heated, the bottom of the bed being brought to a red heat of from 1200° to 1700° F. Chlorine gas is then introduced through the lines 19 and 9, at a rate of 150 pounds per hour. After one hour, the rate is increased to 250 pounds per hour, and after an additional hour, the rate is increased to 350 pounds per hour. The rate of chlorine introduction is maintained at 350 pounds per hour for sixteen hours. The effluent is passed to the condenser line 23. At the end of this time, the chlorine is shut off and air is introduced by turning valve 13, the rate of introduction being 15 cubic feet per minute. At the same time, the valve 21 is turned so that line 11 is connected to line 25. After one-half hour at this rate, the air rate is increased to 85 cubic feet per minute, and is maintained at this rate for a period of 3½ hours. At the end of the 22 hour cycle, the charging opening 5 is opened and an additional 1500 pounds of fresh silicon carbide is added to the furnace. During the introduction of the air, oxidation of carbon within the furnace has been sufficient to maintain the heat of the furnace at its operating temperature, so that as soon as the fresh charge of silicon carbide is added, the valve 13 is turned to connect line 9 with line 19 and the valve 21 is turned to connect the furnace to the condenser 23. The cycle is then repeated.

When carrying out the process in this manner, it has been found that there is no oxidation or deactivation of the silicon carbide and that there is no build-up of impurities in the furnace. Further, by burning off the carbon in this manner, when the charging opening is opened, there is no problem with silicon tetrachloride fumes during the charging operation.

I claim:

1. In the process of chlorinating silicon carbide to produce silicon tetrachloride, the step of cleaning a hot chlorination reactor containing silicon carbide and elementary carbon, comprising introducing an oxygen-containing gas into the chamber while maintaining the chamber at an elevated temperature whereby a portion of the carbon is oxidized and a portion of the carbon is entrained and blown from the furnace.

2. A process for the manufacture of silicon tetrachloride comprising placing a charge of silicon carbide in a reaction zone, blowing chlorine through the hot reaction zone, whereby there is produced elementary carbon and silicon tetrachloride, removing silicon tetrachloride from the reaction zone in vapor phase and periodically interrupting the introduction of chlorine and introducing air into the hot reaction zone whereby at least a portion of the carbon is oxidized and whereby a portion of the carbon is entrained and blown from the hot reaction zone by said air.

References Cited in the file of this patent

UNITED STATES PATENTS

| | | |
|---|---|---|
| 1,107,926 | Frank | Aug. 18, 1914 |
| 1,271,713 | Hutchins | July 9, 1918 |
| 1,973,851 | Feiler et al. | Sept. 18, 1934 |
| 2,071,721 | Bagley et al. | Feb. 23, 1937 |
| 2,401,544 | Brallier | June 4, 1946 |